United States Patent [19]

Taniyama et al.

[11] Patent Number: 4,734,018

[45] Date of Patent: Mar. 29, 1988

[54] VACUUM PUMP WITH PLURAL LABYRINTH SEAL PORTIONS

[75] Inventors: Minoru Taniyama, Ibaraki; Masahiro Mase, Tochigi; Takashi Nagaoka, Ibaraki, all of Japan

[73] Assignee: Hitachi, Ltd., Tokyo, Japan

[21] Appl. No.: 947,282

[22] Filed: Dec. 29, 1986

[30] Foreign Application Priority Data

Dec. 27, 1985 [JP] Japan ................................ 60-292727

[51] Int. Cl.[4] ............................................. F04B 17/00

[52] U.S. Cl. ................................ 417/423 R; 417/366; 415/112; 415/175; 277/53; 277/70; 277/71; 277/79

[58] Field of Search .......... 417/423 C, 423 M, 424 A, 417/366, 407; 415/90, 110, 111, 112, 175; 277/3, 53, 70, 71, 79

[56] References Cited

U.S. PATENT DOCUMENTS

| | | | |
|---|---|---|---|
| 1,886,714 | 11/1932 | Moss | 415/111 |
| 1,986,706 | 1/1935 | Beyer | 277/15 X |
| 3,420,434 | 1/1969 | Swearingen | 415/112 |
| 3,508,758 | 4/1970 | Strub | 277/15 |
| 3,831,381 | 8/1974 | Swearingen | 277/15 X |
| 3,942,716 | 3/1976 | Jacobson et al. | 494/15 |
| 4,116,592 | 9/1978 | Cherny et al. | 415/90 X |
| 4,140,441 | 2/1979 | Patterson | 415/112 X |
| 4,273,343 | 6/1981 | Visser | 277/53 |
| 4,477,223 | 10/1984 | Giroux | 415/111 X |
| 4,512,725 | 4/1985 | Saulgeot | 415/90 X |

FOREIGN PATENT DOCUMENTS

| | | |
|---|---|---|
| 464625 | 12/1968 | Fed. Rep. of Germany . |
| 2075112 | 9/1971 | France . |
| 2310481 | 12/1976 | France . |

*Primary Examiner*—Carlton R. Croyle
*Assistant Examiner*—Eugene L. Szczecina, Jr.
*Attorney, Agent, or Firm*—Antonelli, Terry & Wands

[57] ABSTRACT

A vacuum pump with a seal structure for a pump unit of the vacuum pump and a driving mechanism for rotating a rotor in the pump stages of the pump is disclosed. The seal structure is provided with a narrow gap sealing arrangement formed by a stationary member which is opposed to the portion of a shaft of the driving mechanism which is between the pump unit and an upper bearing supporting the same shaft, which narrow gap sealing arrangement comprises first, second and third seal portions; a mechanism for supplying a discharge gas to the first seal portion; and a mechanism for supplying a purge gas to the second and third seal portions. Owing to these parts, the feed rate of the purge gas can be minimized, and the entry of the oil mist, which occurs during the lubrication of the bearing, into the interior of the pump unit can be prevented. This enables the interior of the pump unit to be kept clean.

5 Claims, 5 Drawing Figures

1a
3
2
A
B
3a
13
14
2a
1b
12
11
6
16
4
8
5b
5a
7
9
10

VACUUM PUMP WITH PLURAL LABYRINTH SEAL PORTIONS

BACKGROUND OF THE INVENTION

1. Field of the Invention

This invention relates to a vacuum pump in which the pressure at that outlet port is maintained at atmospheric pressure, and more particularly to a shaft seal structure between pump stages of such a pump and a driving means for turning impellers in pump stages thereof.

2. Description of the Prior Art

A semiconductor manufacturing apparatus requires a high-degree vacuum chamber, which consists generally of a turbomolecular pump having excellent pumping performance in a molecular flow region thereof. However, the property of the turbomolecular pump depends upon the pressure at the outlet port. For example, in order to obtain normal performance of this pump, a pressure of $10^{-2}$–$10^{3}$ Torr at the outlet port is required. In order to obtain such a low pressure at the outlet port, it is necessary that a pre-treatment be done by an auxiliary pump, which is usually a rotary pump. Although the turbomolecular pump is used advantageously for obtaining high vacuum, it requires an auxiliary pump. This causes the dimensions of the apparatus to increase, and the operation thereof to become complicated. Therefore, the use of the turbomolecular pump is limited.

Under the circumstances, it has been demanded that a vacuum pump of unitary construction, which is made on the basis of the principle of a turbomolecular pump in which the characteristics of other types of pumps are incorporated, be practically produced. The vacuum pumps of unitary construction include the vacuum pump disclosed in U.S. Pat. No. 3,969,039. This vacuum pump is constructed so that it is provided in the portion of the interior of its casing which is between an inlet port and a outlet port thereof with axial-flow turbomolecular pump stages, and drag molecular pump stages, centrifugal compressor stages and vortex diode pump stages which pump stages are connected in the mentioned order.

In a conventional vacuum pump, it is impossible that a driving means, such as a motor for rotating a rotor in a pump unit and an outlet port of the pump, i.e. a hollow in a pump unit are shut off from each other perfectly. Consequently, a corrosive gas and a dust-containing gas, which are sucked by the vacuum pump, and which are noxious to the driving means, enter the driving means to cause the parts thereof to be corroded or damaged by the dust. Also, the mist of a lubricating oil supplied to the bearings would enter the interior of the pump to hamper the cleaning of the same.

The means for solving these problems include a means for filling the interior of the driving means with a purge gas.

In the above-described example, a purge gas is supplied constantly to the interior of the driving means to prevent the entry of noxious gases from the hollow space in the pump unit thereinto. In order that the purge gas is discharged from the interior of the driving means into the hollow space in the pump unit as the presence of the purge gas continuously overcomes that in this hollow space, a large quantity of purge gas is required, and this causes the operation cost to increase.

In the above example, a spiral groove is formed in the wall which defines a clearance through which the purge gas in the interior of the driving means is discharged to the hollow space in the pump unit, in such a manner the purge gas is discharged from the driving means to this hollow space as the spiral groove is rotated. However, even in this case, an increase in the quantity of pure gas in use cannot be avoided.

SUMMARY OF THE INVENTION

An object of the present invention is to provide a vacuum pump constructed so that the entry of a noxious corrosive gas and dust into a driving means can be prevented by a minimal quantity of purge gas.

Another object of the present invention is to provide a vacuum pump constructed so as to prevent the bearing lubricating oil mist from flowing out into the interior of a pump unit.

To achieve these objects, the present invention is provided with a narrow gap sealing means formed of a stationary member which is opposed to a shaft positioned between pump unit and a bearing, which narrow gap sealing means consists of a first seal portion adapted to circulate a part of a discharge gas from the pump unit to the rear surface of the final stage impeller, a second seal portion adapted to supply a purge gas to the first seal portion, and a third seal portion adapted to supply the purge gas to the side of the bearing; a means for supplying a part of the discharge gas to the first seal portion; and a means for supplying the purge gas to the second and third seal portions.

DESCRIPTION OF THE PREFERRED EMBODIMENT

An embodiment of the present invention will now be described in detail with reference to the drawings.

Figure 1:
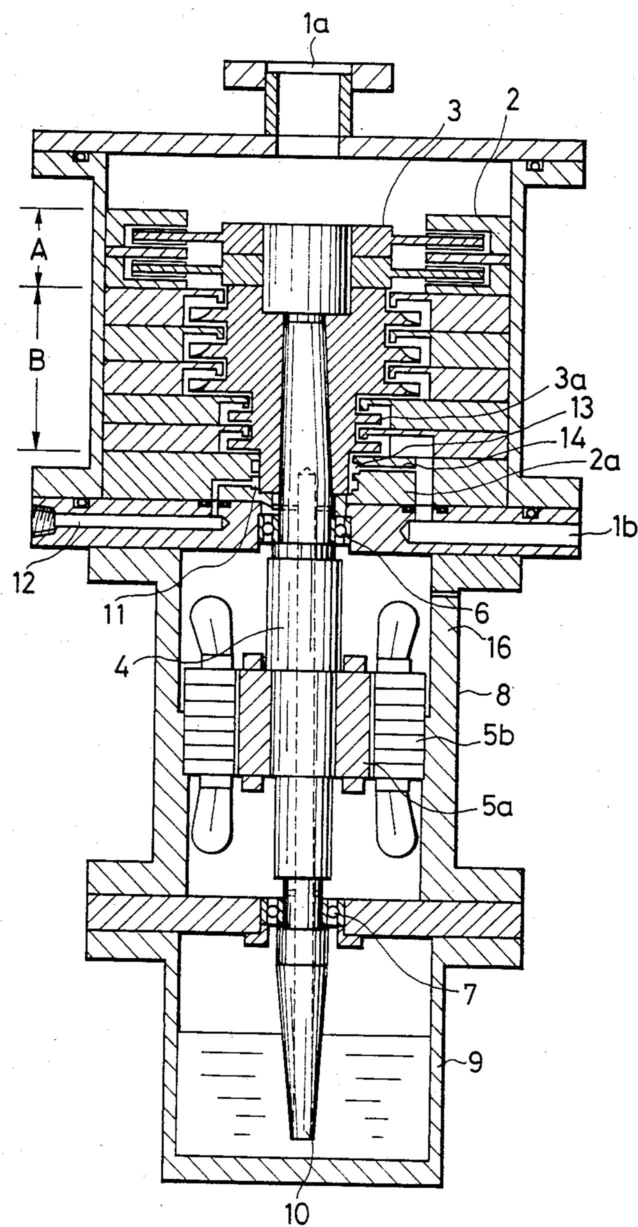
FIG. 1 is a longitudinal section of an embodiment of the vacuum pump according to the present invention.

Referring to FIG. 1, a casing 1 having a inlet port 1*a* and a outlet port 1*b* is provided therein with a plurality of stators 2 which are arranged in the axial direction of the casing, and a rotor 3 positioned between the stators and mounted fixedly on a driving shaft 4. A driving means for rotating this driving shaft 4, for example, a motor rotor 5*a* constituting a high-frequency motor is also mounted fixedly on the driving shaft 4. The driving shaft 4 is supported on bearings 6, 7, which are lubricated with an oil, and has an overhanging structure.

A motor stator 5*b* is provided on the portion of the inner surface of a motor case 8 which is opposed to the motor rotor 5*a*. The lower end portion of the driving shaft 4 is immersed in an oil storage casing 9, and the oil is drawn up through an oil passage 10, which is made in the axial portion of the driving shaft 4, to lubricate the bearings 6, 7 therewith.

The portion of a pump mechanism consisting of the stators 2 and rotor 3 which is on the side of the inlet port 1*a* forms a centrifugal compressor stage A, and the portion of the pump mechanism which is on the downstream side of the centrifugal compressor stage A a peripheral pump stage B. A narrow gap sealing means formed of a rotary member 3*a*, which is positioned in the portion of the peripheral pump stage B through which the driving shaft 4 is passed, and a stationary member 2*a* opposed to the rotary member 3*a* is provided between this pump stage B and a bearing 6, this narrow gap sealing means consisting of first, second and third seal portions which will be described later.

The first seal portion consists of a labyrinth seal 15 formed between the peripheral pump stage B and an annular groove for a discharge gas, which is provided in the stationary member 2*a*. The labyrinth 15 constituting the first seal portion has the functions of circulating a part of a discharge gas from the pump member to the rear surface of the impeller of the peripheral pump stage B via a discharge gas passage 14 and the annular groove 13 for the discharge gas.

The second seal portion consists of a labyrinth seal 15 formed between the annular groove 13 and an annular groove 11 for a purge gas, which is provided in the stationary member 2*a*. This labyrinth seal 15 constituting the second seal portion has the function of supplying the purge gas, such as a nitrogen gas, which flows from the outside thereinto via a purge gas passage 12 and an annular groove 11 for the purge gas, to the first seal portion. The third seal portion consists of a labyrinth seal 15 formed between the annular groove 11 and bearing 6. This labyrinth seal 15 constituting the third seal portion has the functions of supplying a part of the purge gas to the side of the bearing 6.

The motor case 8 is provided in its side portion with small bores 16 by which the interior and exterior of the motor case are communicated with each other, so that the interior of the motor case 8 is maintained constantly at an atmospheric pressure.

The pressure of the purge gas to be supplied to the second and third seal portions shall be set slightly higher than the atmospheric pressure.

The operation of the embodiment having the above-mentioned construction will now be described.

When an electric current is applied to the driving means, for example, a high-frequency motor, which consists of the motor rotor 5*a* and motor stator 5*b*, the driving shaft 4 is rotated to cause the centrifugal compressor stage A and peripheral pump stage B to be rotated accordingly. The gas to be discharged is sucked from the inlet port 1*a*, compressed by the centrifugal compressor stage A and introduced into the peripheral pump stage B, in which the gas is further compressed and discharged from the outlet port 1*b* to the atmospheric air.

During this time, the rear side of the final impeller in the peripheral pump stage becomes vacuum, while a part of the discharge gas is supplied to the annular groove 13 via the discharge gas passage 14 with also a part of the purge gas supplied from the annular groove 11 thereinto via the labyrinth seal 15. Consequently, the pressure in the annular groove 13 and that on the rear surface of the final impeller in the peripheral pump stage B are balanced with each other, so that the discharge gas flows circularly from the labyrinth seal 15 constituting the first seal portion to the discharge gas passage 14 via the rear surface of the final impeller in the pump stage B. As a result, a difference between the pressure in the annular groove 13 and that in the annular groove 11 becomes small, and the flow rate of the purge gas supplied to the annular groove 11 decreases. Moreover, the entry of the noxious gas and dust which are contained in the discharge gas into the motor case 8, in which the driving means is housed, can be prevented. A part of the purge gas supplied to the annular groove 11 via the purge gas passage 12 is sent toward the bearing 6. In consequence, the oil mist, which occurs due to the lubricating oil supplied to the bearing 6, can be prevented from flowing out into the flow passage in the pump unit.

Figure 2:
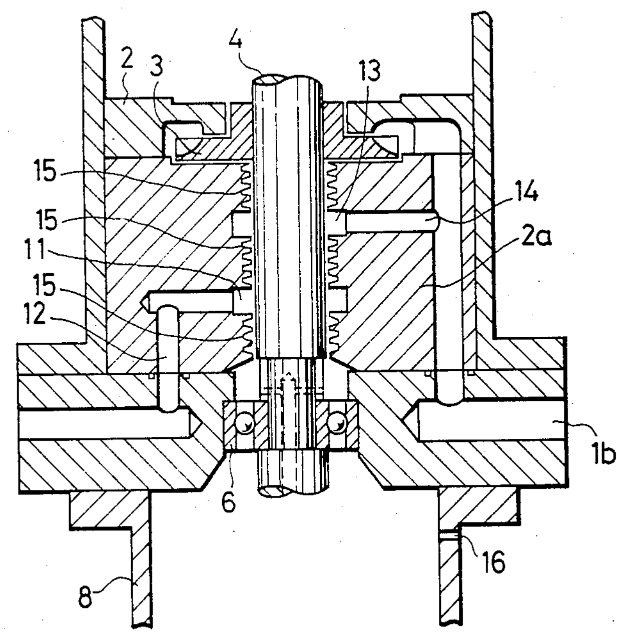
FIG. 2 is an enlarged view of a principal portion of a narrow gap sealing means in the vacuum pump according to the present invention.
Figure 3:
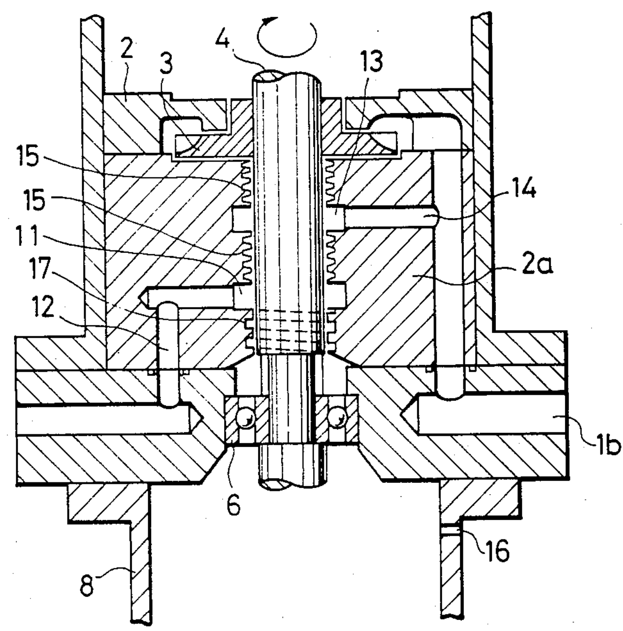
FIGS. 3–5 are longitudinal views of other examples of the narrow gap sealing means in the vacuum pump according to the present invention.

FIG. 3 shows another example of the narrow gas sealing means in the vacuum pump according to the present invention. The difference between the narrow gas sealing means of FIG. 3 and that in the embodiment of FIG. 2 resides in that the third seal portion provided between the annular groove 11 for the purge gas and the bearing 6 in the example of FIG. 3 consists of a threaded seal 17.

The threaded seal 17 has the function of sending a part of the purge gas forcibly from the annular groove 11 toward the bearing 6 while the driving shaft 4 is rotated in the direction of an arrow.

Owing to this construction, the flow rate of the purge gas supplied to the annular groove 11 can further be reduced.

Figure 4:
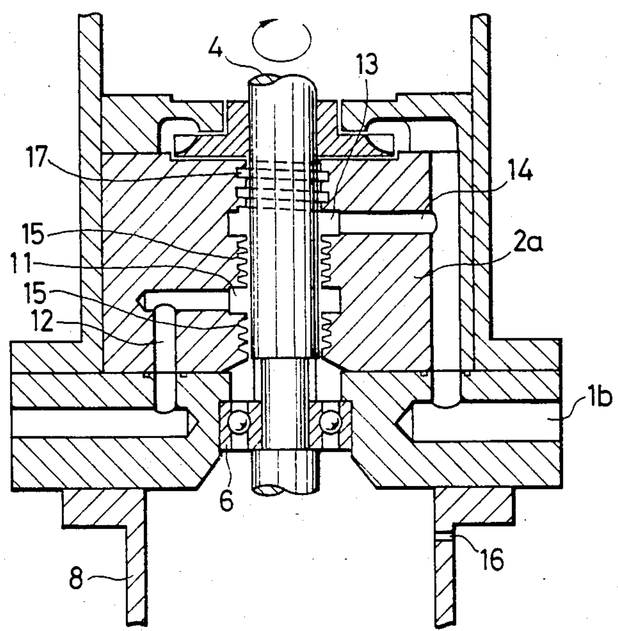

FIG. 4 shows still another example of the narrow gap sealing means. The example of FIG. 4 differs from those of FIGS. 2 and 3 in that the first seal portion provided between the annular groove 13 for the discharge gas and the rear surface of the final impeller in the peripheral pump stage B consists of a threaded seal 17.

This threaded seal 17 causes a circular flow of discharge gas to be formed between the rear surface of the final impeller in the peripheral pump stage B and the annular groove 13 while the driving shaft 4 is rotated in the direction of the arrow. Consequently, a difference between the pressure in the annular groove 13 for discharge gas and that in the annular groove 11 for purge gas can be minimized, so that the feed rate of the purge gas can be reduced.

Figure 5:
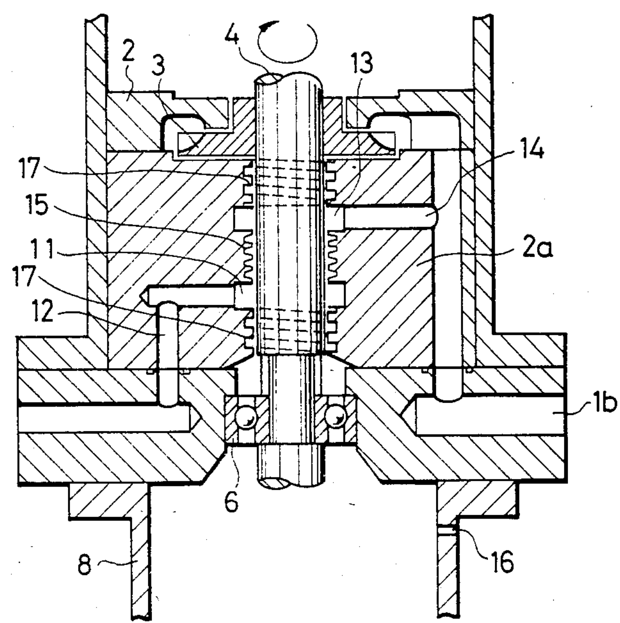

FIG. 5 shows a further example of the narrow gap sealing means. The example of FIG. 5 differs from those of FIGS. 2–4 in that the first and third seal portions consist of threaded seals 17.

This construction also has the same effect as the construction described above of FIGS. 2–4. In the embodiment of the present invention, the lubrication of the bearings is done by the lubricating oil drawn up from one oil storage casing. The bearings may also be lubricated by supplying a lubricating oil thereto from another pressure oil source. In this case, the oil in the oil storage casing can be used for cooling the driving means.

According to the present invention, an annular groove, into which a purge gas is introduced from the outside, is provided in the wall through which the driving shaft is passed, and there is also provided an annular groove, into which a discharge gas from the pump is introduced, between the annular groove for the purge gas and a pump unit. Theefore, a difference between the pressures on the front and rear sides of the annular groove for the purge gas becomes small, so that the feed rate of the purge gas can be reduced. Moreover, the leakage of the vapor of the lubricating oil into the interior of the pump body can be prevented. This enables a clean vacuum pump to be obtained.

What is claimed is:

1. A vacuum pump having a casing provided with an inlet port and an outlet port, a plurality of pump stages provided in said casing, a driving means connected to a shaft of said pump stages, bearings supporting said shaft, and a means for supplying a lubricating oil to said bearings, a gas sucked from said inlet port being discharged from said outlet port, comprising a narrow gap sealing means formed by the portion of said shaft which is between said pump stages and the upper bearing and a stationary member opposed to said portion of said shaft, and comprising a first seal portion for circulating a part of a discharge gas from said pump stages to the rear surface of said pump final impeller, a second seal portion for supplying a purge gas to said first seal portion, and a third seal portion for supplying said purge gas toward said bearing; a means for supplying a part of said discharge gas to said first seal portion; and a means for supplying said purge gas to said second and third seal portions, and wherein said means for supplying a part of said discharge gas to said first seal portion comprises an annular groove for discharge gas, which is provided in said stationary member, and a discharge gas passage formed in said stationary member and communicated with said annular groove so that said discharge gas flows circularly from the first seal portion to the discharge gas passage via said rear surface of said pump final impeller, said means for supplying said purge gas to said second and third seal portions comprising an annular groove for purge gas, which is provided in said stationary member, and a purge gas passage communicated with said annular groove for purge gas and used to supply said purge gas from the ouside to the same annular groove.

2. A vacuum pump according to claim 1, wherein said first, second and third seal portions constituting said narrow gap sealing means consists of labyrinth seals.

3. A vacuum pump according to claim 1, wherein said first and second seal portions constituting a part of said narrow gap sealing means comprise labyrinth seals, said third seal portion which constitutes the remaining part of said narrow gap sealing means comprising a threaded seal.

4. A vacuum pump according to claim 1, wherein said first seal portion constituting a part of said narrow gap sealing means comprises a threaded seal, said second and third seal portions which constitutes the remaining part of said narrow gap sealing means comprising labyrinth seals.

5. A vacuum pump according to claim 1, wherein said first and third seal portions constituting a part of said narrow gap sealing means comprise threaded seals, said second seal portion which constitutes the remaining part of said narrow gap sealing means comprising a labyrinth seal.

* * * * *